(12) United States Patent
Alric et al.

(10) Patent No.: US 7,131,623 B2
(45) Date of Patent: Nov. 7, 2006

(54) MECHANICAL HOLDINGS SYSTEM FOR A DEVICE WITH AN APPRECIABLY FLAT ELEMENT, PARTICULARLY FOR A LIQUID CRYSTAL SCREEN DISPLAY DEVICE

(75) Inventors: Stéphane Alric, Merignac (FR); Jean-Noël Klaver, Pessac (FR); Xavier Bibes, Cestas-Gazinet (FR)

(73) Assignee: Thales, Paris (FR)

( * ) Notice: Subject to any disclaimer, the term of this patent is extended or adjusted under 35 U.S.C. 154(b) by 542 days.

(21) Appl. No.: 10/344,663

(22) PCT Filed: Aug. 24, 2001

(86) PCT No.: PCT/FR01/02668

§ 371 (c)(1),
(2), (4) Date: Feb. 14, 2003

(87) PCT Pub. No.: WO02/16083

PCT Pub. Date: Feb. 28, 2002

(65) Prior Publication Data

US 2003/0169396 A1    Sep. 11, 2003

(51) Int. Cl.
*F16M 11/00* (2006.01)
(52) U.S. Cl. .................. 248/694; 361/681; 349/58
(58) Field of Classification Search ........... 248/613, 248/694; 361/681, 683; 349/58, 187
See application file for complete search history.

(56) References Cited

U.S. PATENT DOCUMENTS

| | | |
|---|---|---|
| 5,131,780 A | 7/1992 | Love |
| 5,479,285 A * | 12/1995 | Burke .................. 349/58 |
| 6,166,788 A | 12/2000 | Ha et al. |
| 6,411,353 B1 * | 6/2002 | Yarita et al. ........... 349/59 |
| 6,522,377 B1 * | 2/2003 | Kim et al. ............ 349/114 |
| 2003/0174260 A1 * | 9/2003 | Labrousse et al. ....... 349/58 |

OTHER PUBLICATIONS

Patent Abstract of Japanese Publication No. 08 281 561 A, Publication Date: Oct. 29, 1996.
Patent Abstract of Japanese Publication No. 01 211721 A, Publication Date: Aug. 24, 1989.
Patent Abstract of Japanese Publication No. 06 138443 A, Publication Date: May 20, 1994.

* cited by examiner

*Primary Examiner*—Ramon O Ramirez
(74) *Attorney, Agent, or Firm*—Lowe Hauptman & Berner LLP

(57) ABSTRACT

The invention relates to the field of mechanical holding systems for devices with appreciably flat element.

This is a device comprising: at least one appreciable flat element (4); the surround (1) intended to receive the element (4), the surround (1) comprising two parts (2, 3) intended to trap a portion of the element (4) between them in a direction (Y) roughly orthogonal to the mean plane (XZ) of the element (4) via at least one elastic gasket (7, 8); a mechanical system for holding the relative position of the parts (2, 3) of the surround (1) one with respect to the other; the parts (2, 3) of the surround (1) and the mechanical holding system being structured and arranged in such a way as to be able to hold several relative positions of the parts (2, 3) of the surround (1) one with respect to the other in a direction (Y) roughly orthogonal to the mean plane (XZ) of the element (4).

The invention is, for example, applied in liquid crystal display devices.

19 Claims, 2 Drawing Sheets

MECHANICAL HOLDINGS SYSTEM FOR A DEVICE WITH AN APPRECIABLY FLAT ELEMENT, PARTICULARLY FOR A LIQUID CRYSTAL SCREEN DISPLAY DEVICE

The invention relates to the field of mechanical holding systems for devices involving an appreciably flat element, particularly for liquid crystal display devices. The device comprises one or more appreciably flat elements. An appreciably flat element is an element of which one of the dimensions, known as the thickness, is smaller than one half of each of the other two dimensions which together form the mean plane of the element. The flat element needs to be held mechanically between two parts of the surround of the device using a mechanical holding system, preferably a demountable one.

According to a prior art known in the field of liquid crystal screen display devices, a surround comprising two parts intended to trap the appreciably flat element via two elastic gaskets is provided. The two parts of the surround are brought into abutment against one another via a contact surface parallel to the mean plane of the appreciably flat element. The two parts of the surround are held one with respect to the other by a clamping device the axis of which is orthogonal to the mean plane of the appreciably flat element. Between the appreciably flat element and each of the parts of the surround intended to trap the appreciably flat element there is a gasket with a square cross section so as to absorb the tolerances in the direction of the thickness of the appreciably flat element.

Figure 1:
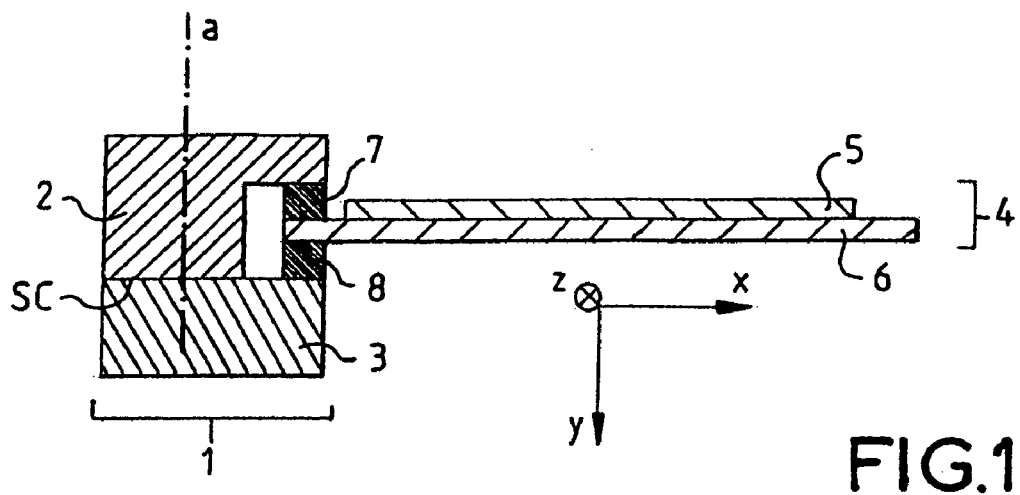

FIG. 1 gives an example of such a device according to the prior art. FIG. 1 schematically depicts a sectioned view of a device with an appreciably flat element held mechanically by a system according to the prior art. The appreciably flat element 4 is a liquid crystal screen.

The screen 4 comprises a top plate 5 and a bottom plate 6 between which the liquid crystals are arranged. The bottom plate 6 is generally known as TFT, while the top plate 5 is generally known as the back electrode. The useful region of the screen 4 corresponds to the area of the top plate 5. The bottom plate 6, which is larger than the top plate 5, is held between the two parts of the surround 1, between the upper part 2 and the lower part 3, respectively, by two gaskets, namely the upper gasket 7 and the lower gasket 8. The mean plane of the screen 1 is the plane XZ while the direction of the thickness of the screen 1, that is to say the direction orthogonal to the mean plane XZ of the screen 1 is the axis Y. The two, upper 2 and lower 3, parts of the surround 1 are brought into abutment one against the other via the contact surface SC. The axis a of clamping of the two parts 2 and 3 of the surround together is depicted in chain line.

One disadvantage with this prior art is the difficulty that the mechanical holding system has in holding the appreciably flat element firmly while at the same time remaining capable of absorbing the tolerances which are sometimes high. The problem is that the holding force exerted by the parts of the surround on the appreciably flat element via the gaskets is uncontrolled, this force depending on the tolerance on the dimensions lying between the two parts of the surround in a direction orthogonal to the mean plane of the appreciably flat element. Thus, if the parts of the surround are clamped together hard enough to hold the appreciably flat element firmly when the dimensions are at a minimum, then when the dimensions are at a maximum there is a risk that the gripping will be too firm either not to damage the appreciably flat element or not to disrupt its operation when the appreciably flat element is fragile, which is the preferred case of a liquid crystal screen the image displayed on which may be degraded, for example exhibiting white areas, or not to damage the gasket or gaskets situated between the appreciably flat element and the surround; and vice versa. An appreciably flat element held too loosely carries the risk of being damaged as, for example, a liquid crystal screen subjected to high levels of vibration carries the risk of the vibration shearing off its electrical connections to the rest of the device. The troublesome vibrations are especially transverse vibrations, that is to say vibrations in the mean plane of the appreciably flat element, rather than vibrations orthogonal to the mean plane of the appreciably flat element. For an elastic gasket to play its part correctly, it needs to be compressed neither too much nor too little.

The invention proposes a solution in which the force with which the appreciable flat element is held by the parts of the surround via at least one elastic gasket is controlled. Thus, the compromise reached between, on the one hand, sufficiently firm holding of the appreciably flat element when the dimensions between the two parts of the surround in a direction orthogonal to the mean plane of the appreciably flat element are at a minimum and, on the other hand, avoiding excessive crushing either of the gasket or of the appreciably flat element when the dimensions lying between the two parts of the surround a direction orthogonal to the mean plane of the appreciably flat element are at a maximum, is far better.

According to the invention, there is provided a device comprising at least an appreciably flat element; a surround intended to receive the element, the surround comprising two parts intended to trap a portion of the element between them in a direction roughly orthogonal to the mean plane of the element via at least one elastic gasket; a mechanical system for holding the relative position of the parts of the surround, one with respect to the other; characterized in that the parts of the surround and the mechanical holding system are structured and arranged in such a way as to be able to hold several relative positions of the parts of the surround, one with respect to the other, in a direction roughly orthogonal to the mean plane of the element.

Figure 2:
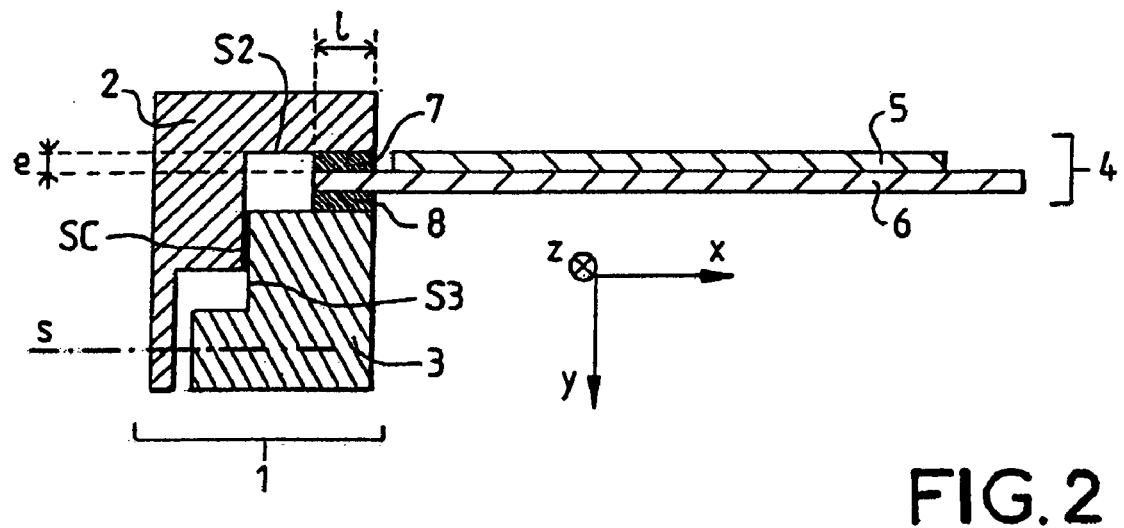
Figure 3:
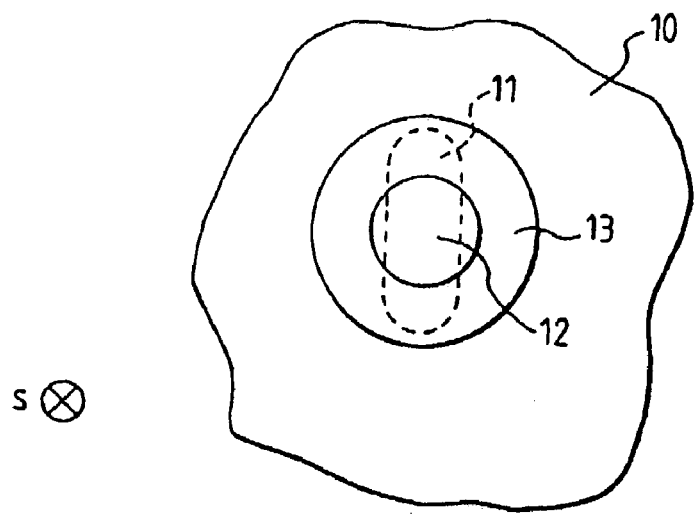
Figure 4:
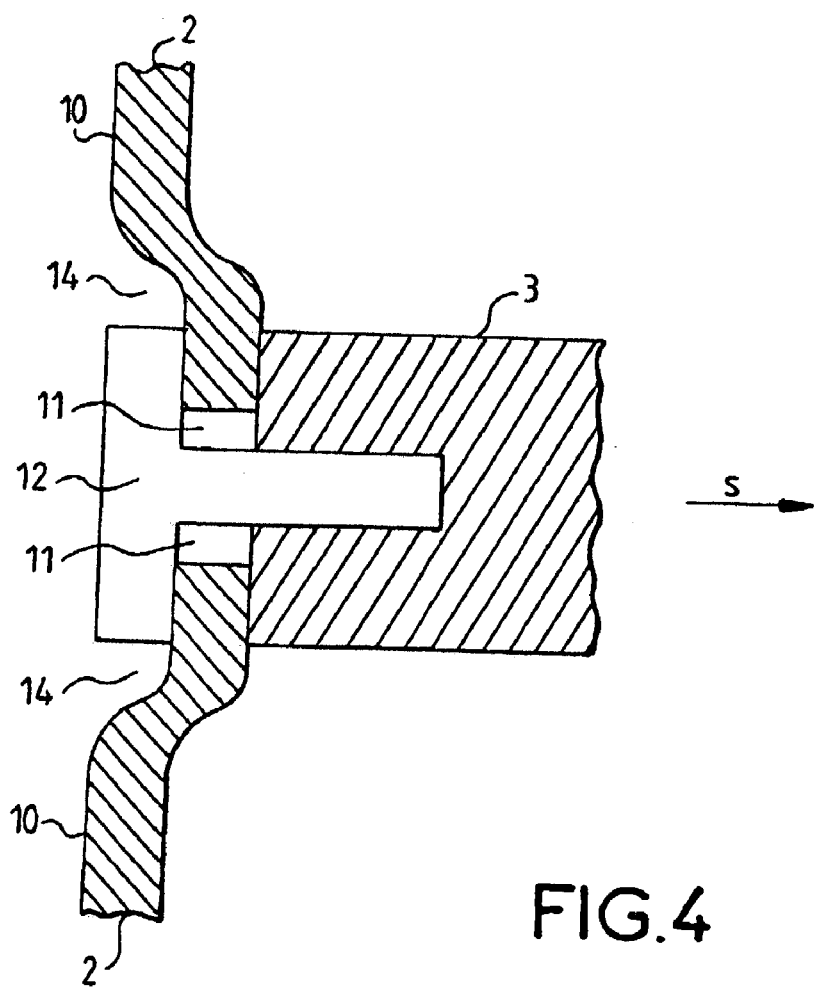

The invention will be better understood and other features and advantages will become apparent with the aid of the description hereinafter and of the appended drawings which are given by way of example in which:

FIG. 1 schematically depicts a sectioned view of a device involving an appreciably flat element held mechanically by a system according to the prior art;

FIG. 2 schematically depicts a sectioned view of a preferred embodiment of a device involving an appreciably flat element held mechanically by a system according to the invention;

FIG. 3 schematically depicts a side view of an advantageous detail of a device involving an appreciably flat element held mechanically by a system according to the invention;

FIG. 4 schematically depicts a sectioned view of another advantageous detail of a device involving an appreciably flat element held mechanically by a system according to the invention.

The device comprises an appreciably flat element which will need to be held firmly between the two parts of a surround without, however, being crushed. In all of the text which follows, when we speak of the parts of the surround without qualifying this term in any way, we are speaking, unless mentioned otherwise, about those parts of the surround which are intended to trap the appreciably flat element. In all the text which follows, we shall speak of the appreciably flat element or of the liquid crystal screen, but it is not excluded for the device according to the invention to have several of these, it being possible for the various appreciably flat elements to be held by just one or several sets of different surround parts. The device also comprises a surround intended to receive the appreciably flat element, the surround comprising two parts intended to trap a portion of the appreciably flat element between them in a direction roughly orthogonal to the mean plane of the appreciably flat element via at least one elastic gasket. The surround comprises at least two parts whose purpose is to be able to trap the appreciably flat element between them, it being possible for the surround to have several other parts. Trapping is achieved in a direction roughly orthogonal to the mean plane of the appreciably flat element, like in the prior art, the ideal being an orthogonal direction because the less orthogonal the direction, the more lateral loading will be placed on the elastic gasket or gaskets thus deforming them laterally, which is bad for the device as a whole and carries the risk of damaging or disrupting its operation. Trapping is via at least one elastic gasket arranged between the appreciably flat element and one of the parts of the surround, a plasticized film being, for example, placed between the appreciably flat element and the other part of the surround, or alternatively via two elastic gaskets, each interface between the appreciably flat element and the surround being occupied by an elastic gasket. An elastic gasket is a gasket which can be compressed by force. A portion of the appreciably flat element is trapped, and this portion is preferably its periphery. To go all around the periphery of the appreciably flat element, the elastic gasket or gaskets are either made as a single piece or in several sections depending on the production constraints imposed by the type of appreciably flat element anticipated. The device also comprises a mechanical system for holding the relative position of the parts of the surround one with respect to the other so as to be able to keep the appreciably flat element trapped.

Whereas in the prior art, the parts of the surround and the mechanical holding system were structured and arranged in such a way that the parts of the surround butted against each other, this abutment position being the only relative position of the parts of the surround one with respect to the other in a direction roughly orthogonal to the mean plane of the appreciably flat element, in the invention the parts of the surround and the mechanical holding system are structured and arranged in such a way as to be able, in a direction roughly orthogonal to the mean plane of the appreciably flat element, to hold several relative positions of the parts of the surround one with respect to the other. By virtue of the different relative positions of the parts of the surround one with respect to the other, the mechanical holding system can adapt to suit different dimensions lying between the parts of the surround in a direction orthogonal to the mean plane of the appreciably flat element, from the minimum dimensions to the maximum dimensions, even if the tolerance band is wide, while at the same time achieving a good compromise between holding the appreciably flat element firmly enough and avoiding excessive crushing either of the gasket or of the appreciably flat element. For this compromise to be reached, a suitable nominal force merely needs to be applied between the parts of the surround, at the time of mounting, in a direction orthogonal to the mean plane of the appreciably flat element, until this force is balanced by the compression of the elastic gasket or gaskets, that is to say by the opposing force supplied by the compressed gasket or gaskets. Various positions, provided they are close enough together and cover a sufficiently large range, allow the force actually applied to be very close to the desired nominal force, as close as desired because for that all that is required is for the distance between two adjacent positions to be reduced, even in the event of a wide tolerance on the dimensions between the parts of the surround. The various relative positions preferably cover at least one continuos range so that the force actually applied can be roughly equal to the desired nominal force. Setting the appropriate degree of trapping of the appreciably flat element which in the prior art depended on a collection of one or several mechanical dimensions that were expensive to control, but in the invention depends on the application of a force which is far easier to control.

The device is preferably a display device and the appreciably flat element is preferably an appreciably flat display cell. The appreciably flat display cell is advantageously a liquid crystal screen. In the preferred numerical example of the invention, between the two parts of the surround intended to trap the liquid crystal screen, the string of dimensions is approximately 2.7 mm±0.5 mm, namely a difference between the string of minimum dimensions and the string of maximum dimensions of about 1 mm. Now, one or two gaskets with a total thickness of 1.6 mm should be compressed between 10% and 30% of their thickness in order to play their part optimally, and this corresponds to a variation of at most 20% of 1.6 mm, that is to say about 0.3 mm, which is a value well below the 1 mm that typifies the difference between the strings of minimum and maximum dimensions, and which by way of example illustrates the benefit of the invention.

In a preferred embodiment, in order to allow the parts of the surround to have several relative positions one with respect to the other, the parts of the surround intended to trap the appreciably flat element between them, in a held position, have at least one contact surface roughly orthogonal to the mean plane of the appreciably flat element. Optimally, the contact surface is exactly orthogonal to the mean plane of the appreciably flat element, because the only force exerted on the elastic gasket or gaskets is a force exactly orthogonal to the mean plane of the appreciably flat element, whereas as the contact surface becomes less orthogonal to the mean plane of the appreciably flat element, a component of force tangential to the mean plane of the appreciably flat element tends increasingly to be exerted on the elastic gasket or gaskets, carrying an increasing risk of damaging them. The proportion of tangential force that the elastic gasket or gaskets used can take before they are significantly damaged depends on the type of elastic gasket used and therefore on the type of appreciably flat element considered. To allow the various aforementioned relative positions all to be actually reached, the parts of the surround preferably have no parallel contact surface within the range of the aforementioned relative positions, when their relative movement causes them to cover said range, because if they did, part of said range would not be able to be used. Other embodiments are possible, for example a common rail the direction of which is roughly orthogonal to the mean plane of the appreciably flat element, and on which common rail the two parts of the surround can move in order to trap the appreciably flat element.

FIG. 2 schematically depicts a sectioned view of one preferred embodiment of a device involving an appreciably flat element held mechanically by a system according to the invention. Like FIG. 1, FIG. 2 depicts only the surround and the gaskets on the left-hand side of the screen 4, it being understood that the surround and the gaskets may also trap the right-hand side of the screen 4, or even, for example, trap the entire periphery of the screen 4. The appreciably flat element depicted corresponds to a liquid crystal screen 4 comprising a top plate 5 and a bottom plate 6. The useful region of the screen 4 corresponds to the area of the top plate 5. The screen 4 is trapped by the upper 2 and lower 3 parts of the surround 1 via upper 7 and lower 8 elastic gaskets. The gaskets 7 and 8 preferably have a rectangular cross section. The gaskets 7 and 8 have a width 1 and a thickness e which are respectively the length and the width of the rectangular cross section. Between the upper part 2 of the surround 1 and the screen 4 (or more specifically the bottom plate 6 of the screen 4) there is the upper elastic gasket 7. Between the lower part 3 of the surround 1 and the screen 4 (or more specifically the bottom plate 6 of the screen 4) is the lower elastic gasket 8. The upper 2 and lower 3 parts of the surround 1 have a contact surface SC which is parallel to the axis Y, that is to say which is roughly orthogonal to the mean plane of the screen 4 which is parallel to the plane XZ. There is no contact surface for contact between the upper 2 and lower 3 parts of the surround 1 which is parallel to the mean plane of the screen 4. The upper 2 and lower 3 parts of the surround are held in position one with respect to the other by a clamping device described later on in conjunction with FIGS. 3 and 4 and the axis of clamping s of which is orthogonal to the axis of compression of the upper 7 and lower 8 elastic gaskets, said axis of compression being parallel to the axis Y. The axis of clamping S is depicted in chain line. The upper part 2 of the surround 1 has a surface S2 facing the lower part 3 of the surround 1, while the lower part 3 of the surround I has a surface S3 facing the upper part 2 of the surround 1. The surfaces S2 and S3 both advantageously have a stepped profile. The contact surface SC is the contact surface common to the surfaces S2 and S3.

The mechanical holding system is preferably a clamping device comprising at least one screw sliding in an oblong hole. This clamping device advantageously comprises a washer arranged between the screw and the oblong hole, the washer being large enough to increase the area over which the screw bears against the oblong hole. This oblong hole preferably lies in a depression which is located in an outer surface of the surround and which is arranged toward the inside of the device. Thus, the clamping device occupies less space and the ratio between the useful region of the appreciably flat element and the total area of the appreciably flat element is increased. Other holding systems may be used to hold the relative position of the two parts of the surround with respect to each other.

FIG. 3 schematically depicts a side view of an advantageous detail involving the device for clamping the parts of the surround of a device involving an appreciably flat element held mechanically by a system according to the invention. The outer surface 10 of the surround 1, more specifically the outer surface 10 of the upper part 2 of the surround 1 has an oblong hole 11 through which there passes a clamping screw 12 which can be screwed into the lower part 3 of the surround 1. The roles of the upper 2 and lower 3 parts of the surround 1 could also be reversed. The oblong hole 11 allows the upper part 2 of the surround 1 to hold several different relative positions with respect to the lower part 3 of the surround 1. To increase the area over which the clamping screw 12 bears on the oblong hole 11, a washer 13 of sufficient size is arranged between the clamping screw 12 and the oblong hole 11. The axis of clamping s is orthogonal to the plane of FIG. 3.

FIG. 4 schematically depicts a sectioned view of another advantageous detail regarding the device for clamping the parts of the surround of a device involving an appreciably flat element held mechanically by a system according to the invention. The axis of clamping s of the clamping screw 12 is depicted. The outer surface 10 of the upper part 2 of the surround 1 has a depression 14 arranged toward the inside of the device, that is to say toward the appreciably flat element, that is to say, in this instance in FIG. 4, toward the lower part 3 of the surround 1. The clamping device is depicted without a washer in FIG. 4.

The square-section elastic gaskets of the devices according to the prior art make it possible to absorb significant variations in tolerance but have the disadvantage of allowing significant movements of the appreciably flat element in its mean plane. Now, the problems of significant variations in tolerance being settled by the different relative positions of the parts of the surround one with respect to the other in a direction roughly orthogonal to the mean plane of the element which are allowed in a device according to the invention. In order to limit the movements of the appreciably flat element in its mid plane, the elastic gasket or gaskets used in the device according to the invention are preferably flat gaskets. A flat gasket is a gasket the width of which is at least twice its thickness. A flat gasket is more stable than a square gasket, that is to say than a gasket with a square cross section. The width of the flat gasket used is advantageously roughly three times the thickness of said flat gasket. In a preferred numerical example, the width of the flat gasket is about 2.5 mm while its thickness is about 0.8 mm. Each elastic gasket is advantageously made of silicone.

In a preferred embodiment there is at least one gasket between the appreciably flat element and each part of the surround, as in FIG. 2 for example. For example; when the gaskets are placed at the periphery of the appreciably flat element, on each side of the appreciably flat element, there may be either a single gasket running all around the appreciably flat element in the mean plane of the appreciably flat element or alternatively several sections of gasket, that is to say in fact several gaskets arranged along the periphery of the appreciably flat element. In another embodiment, there is at least one gasket between the appreciably flat element and one of the parts of the surround, while there is a plastic film, advantageously a self-adhesive one, between the appreciably flat element and the other part of the surround. As a preference, the first part is the upper part 2 while the second part is the lower part 3, this being so as to afford better sealing of the inside of the device which is situated under the appreciably flat element 4 in FIG. 2.

When the device according to the invention is being mounted, the mounting method preferably involves a step of trapping the element by compression of the gasket or gaskets by applying a nominal force until the nominal force is balanced by the opposing force supplied by the compressed gasket or gaskets. Thus, the holding force exerted by the parts of the surround on the appreciably flat element via the gaskets is fully controlled. The relative movement of the parts of the surround one with respect to the other is preferably in sliding along a contact surface for contact between the parts of the surround, the contact surface being roughly orthogonal to the mean plane of the appreciably flat element so as not to apply to the gasket or gaskets transverse forces, that is to say forces in directions belonging to the mean plane of the appreciably flat element. When the nominal force is being applied, the parts of the surround which come closer together do not butt against each other along a contact surface parallel to the mean plane of the appreciably flat element, and this is so as to be able to use all the intended range of various relative positions of the parts of the surround.

The invention may advantageously be applied to aircraft consoles. An aircraft console uses one or more display devices involving one or more liquid crystal screens.

The invention claimed is:

1. A device, comprising:
   an appreciably flat element;
   a surround intended to receive the element, the surround comprising two parts to trap a portion of the element between them in a direction roughly orthogonal to the mean plane (XZ) of the element via an elastic gasket;
   a mechanical system for holding the relative position of the two parts of the surround, one with respect to the other;
       wherein the parts of the surround and the mechanical holding system are structured and arranged in such a way as to be able to hold several relative positions of the parts of the surround, one with respect to the other, in a direction (Y) roughly orthogonal to the mean plane (XZ) of the element,
       the mechanical holding system is a clamping device, the axis of clamping of which is roughly orthogonal to the axis of compression (Y) of the elastic gasket.

2. The device as claimed in claim 1, wherein the various relative positions cover at least one continuous range.

3. The device as claimed in claim 1, wherein the device is a display device and in that the appreciably flat element is an appreciably flat display cell.

4. The device as claimed in claim 3, wherein the appreciably flat display cell is a liquid crystal screen.

5. The device as claimed in claim 1, wherein the parts of the surround together, in the held position, exhibit at least one contact surface (SC) roughly orthogonal to the mean plane (XZ) of the element.

6. The device as claimed in claim 1, wherein the mechanical holding system is a clamping device comprising at least one screw sliding in an oblong hole.

7. The device as claimed in claim 6, wherein the clamping device comprises a washer arranged between the screw and the oblong hole, the washer being large enough to increase the area over which the screw bears against the oblong hole.

8. The device as claimed in claim 6, wherein the oblong hole lies in a depression which is located in an outer surface of the surround and which is arranged toward the inside of the device.

9. The device as claimed in claim 1, wherein the two parts of the surround each have a surface facing the other part, each of said surfaces having a stepped profile.

10. The device as claimed in claim 1, wherein the gasket is a flat gasket, the width of the flat gasket being at least twice the thickness (e) of the flat gasket.

11. The device as claimed in claim 10, wherein the width of the flat gasket is roughly three times the thickness (e) of the flat gasket.

12. The device as claimed in claim 1, wherein the gasket is made of silicone.

13. The device as claimed in claim 1, wherein there is at least one gasket between the element and each part of the surround.

14. The device as claimed in claim 1, wherein there is at least one gasket between the element and the first part of the surround and there is a plastic film between the element and the second part of the surround.

15. The device as claimed in claim 1, wherein the mechanical holding system is demountable.

16. A method for mounting a device comprising:
    an appreciably flat element;
    a surround intended to receive the element, the surround comprising two parts to trap a portion of the element between them in a direction roughly orthogonal to the mean plane (XZ) of the element via an elastic gasket;
    a mechanical system for holding the relative position of the two parts of the surround, one with respect to the other;
        wherein the parts of the surround and the mechanical holding system are structured and arranged in such a way as to be able to hold several relative positions of the parts of the surround, one with respect to the other, in a direction (Y) roughly orthogonal to the mean plane (XZ) of the element,
    the mechanical holding system is a clamping device, the axis of clamping of which is roughly orthogonal to the axis of compression (Y) of the elastic gasket the method comprising the step of trapping the element by compression of the gasket or gaskets by applying a nominal force until the nominal force is balanced by the opposing force supplied by the compressed gasket or gaskets.

17. The mounting method as claimed in claim 16, wherein the relative movement of the parts of the surround one with respect to the other is in sliding along a contact surface (SC) for contact between the parts of the surround, the contact surface (SC) being roughly orthogonal to the mean plane (XZ) of the appreciably flat element.

18. The mounting method as claimed in claim 16, wherein the nominal force is being applied, the parts of the surround which come closer together do not butt against each other along a contact surface parallel to the mean plane (XZ) of the appreciably flat element.

19. An aircraft console comprising:
    a display device including:
    an appreciably flat element;
    a surround intended to receive the element, the surround comprising two parts to trap a portion of the element between them in a direction roughly orthogonal to the mean plane (XZ) of the element via an elastic gasket;
    a mechanical system for holding the relative position of the two parts of the surround, one with respect to the other;
        wherein the parts of the surround and the mechanical holding system are structured and arranged in such a way as to be able to hold several relative positions of the parts of the surround, one with respect to the other, in a direction (Y) roughly orthogonal to the mean plane (XZ) of the element,
    the mechanical holding system is a clamping device, the axis of clamping of which is roughly orthogonal to the axis of compression (Y) of the elastic gasket.

* * * * *